June 17, 1952     W. HAGELGANTZ     2,600,643

PORTABLE WELDER

Filed March 16, 1949

*INVENTOR.*
WESLEY HAGELGANTZ
BY
Charles R. Werner
ATTORNEY

Patented June 17, 1952

2,600,643

UNITED STATES PATENT OFFICE 2,600,643

PORTABLE WELDER

Wesley Hagelgantz, Bazine, Kans.

Application March 16, 1949, Serial No. 81,700

3 Claims. (Cl. 322—1)

This invention relates in general to welding devices and particularly to a portable electric welder adapted to be drawn by a powered vehicle and to be actuated through a power take off from the same vehicle.

Insofar as I am aware, present day portable electric welders comprise complete units employing their own source of power or driving means for the generator. These units are bulky, not easily transportable and because of their construction are expensive and beyond the reach of the average potential users of such devices.

In most cases, with present day equipment, it is necessary to either remove the part to be welded and bring it in to a welding shop or else to bring the entire machine or structure to a shop for proper welding repairs.

It is therefore the primary object of my invention to provide a portable welding device which can be taken directly to the job. This will eliminate considerable loss of time due to work stoppage and transportation.

It is a second object of the invention to provide a portable welder which can obtain its power from any suitable take off on a tractor, jeep or the like. Power take offs are almost universally standard on tractors and jeeps and similar powered equipment, and therefore the portable welder can be driven from any one of the powered equipment above-mentioned.

Another object of the invention is to provide a pulley adjusting means for the belt drive used on the device.

Further objects and advantages as well as the construction and operation of my device will be clear from the following description in connection with the accompanying drawing in which.

Figure 1:
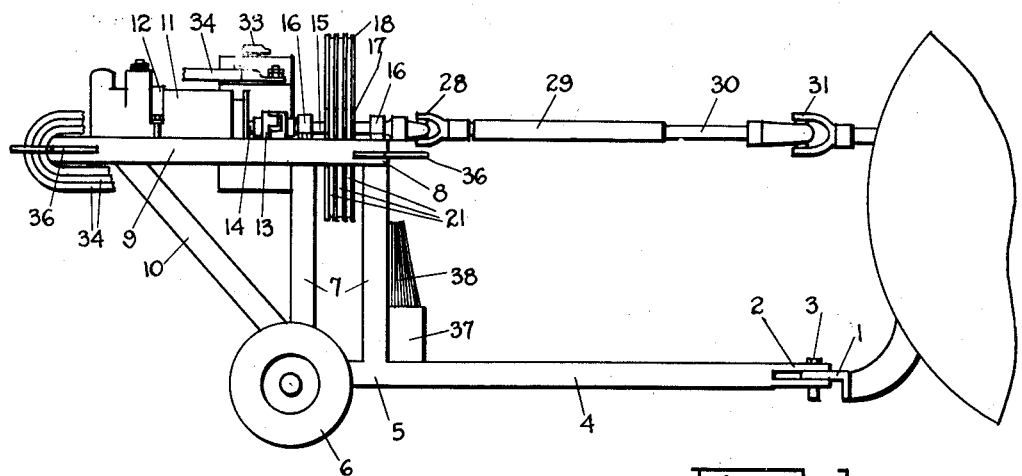
Fig. 1 is a side elevational view of my device with a fragmentary portion of a tractor shown to indicate the power take off for operating the welder.
Figure 2:
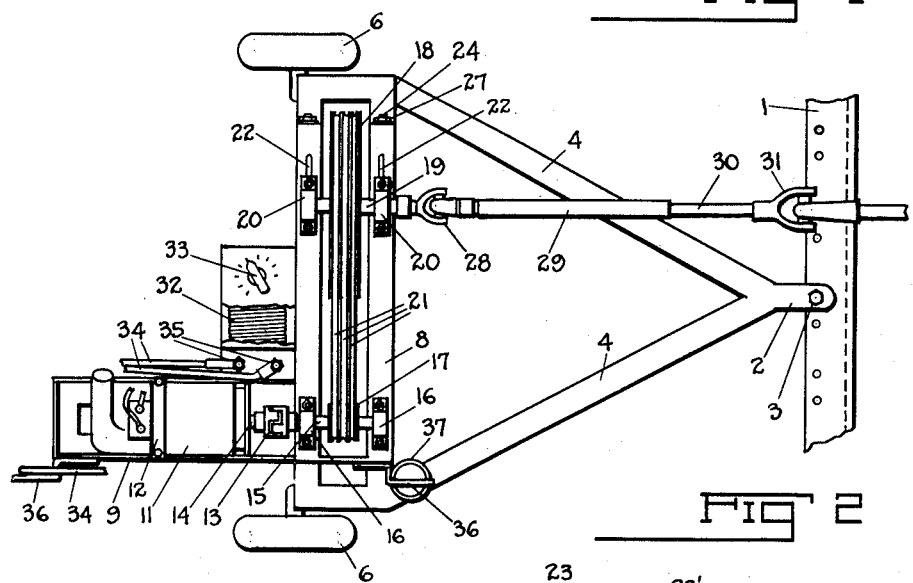
Fig. 2 is a top plan view of the same.
Figure 3:
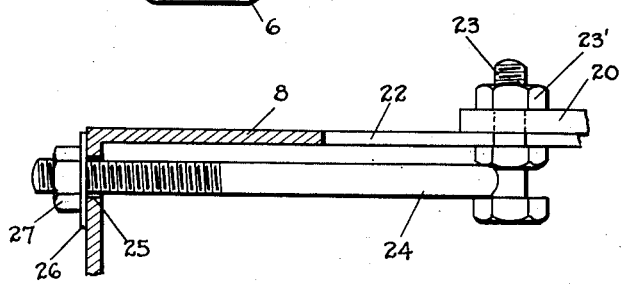
Fig. 3 is an enlarged detailed sectional view of the pulley and belt adjusting means.

Referring now to the drawing by numerals of reference 1 represents a cross bar or hitch of a tractor, jeep or the like, to which the forked member 2 may be secured by suitable pin 3. The forked member 2 is the terminal of a pair of angularly disposed arms 4 which are secured to a frame 5. A pair of wheels 6 are suitably mounted to frame 5 and permit free rolling of the portable welder.

Standards 7 rising from the frame 5 support a smaller frame 8 with a rearwardly extending frame section 9, braced by diagonal 10.

A suitable generator 11, in this case a direct current generator of standard make, is suitably mounted on frame section 9, clamp 12 holding the generator in place. A suitable shock absorbing coupling 13 is secured to the shaft 14 of the generator, the other end of the coupling being secured to a shaft 15 which is suitably carried in bearings 16 which are secured to frame 8, a pulley 17 being mounted on the shaft between said bearings.

In alignment with the small pulley 17 is a large multiple pulley 18 carried on shaft 19 rotatably mounted in bearings 20 secured to the frame 8. Pulleys 17 and 18 may be for any number of belts. I have shown triple pulleys employing three belts 21.

To provide means for adjusting the belts I have shown slots 22 in the frame 8. The bearing fastening screws 23 pass through the slots 22 and are provided with nuts 23', the lower end of the screws 23 carrying adjusting screws 24 which extend laterally out through openings 25 in frame 8. A suitable washer 26 and nut 27 are positioned on each of the adjusting screws 24. Adjustment is accomplished by loosening the bearing fastening screws 23 and turning the nut on the adjusting screw 24 to effect lateral movement of the bearings 20, each bearing being separately adjustable. When the desired tension on the belts is obtained the bearing fastening screws are immobilized by tightening nuts 23'.

Shaft 19 carries a universal point 28 and I have shown a hollow square shaft 29 extending from the universal joint, said shaft telescopically engaging solid square shaft 30 which terminates in another universal joint 31 connected to the power take off on the tractor or jeep through a splined shaft not shown but which is standard equipment.

Adjacent the generator 11 is mounted the reactor coil 32 with rheostat 33, cables 34 connecting to terminals 35, arms 36 being provided and around which the cables may be wound when not in use. Standard welding grips or clamps (not shown) are provided on the cables.

The power take off on a tractor is normally at the center rear thereof. Therefore my device, as shown, is coupled to the tractor in an off-center relation so that the power take off will be centered. However, the universal joints and the telescoping drive shaft assembly 29 and 30 permits free turning movement of the portable welder while it is being drawn and permits coupling with the power take off of any tractor, jeep or other device at almost any angle when it is stationary. A receptacle 37 is provided to hold welding rod 38.

In this specification I have not attempted to include any detailed description of the generator, reactor coil and their electrical components and relation, since these are well known in the art and do not comprise any part of my invention other than their physical relation to the structure I employ to make them portable.

From the foregoing it will be apparent that I have provided a relatively simple arrangement for a portable direct current welder which will render the equipment easily movable so that it can be taken any place where it is needed for welding work, making it suitable for use by farmers, small shops and garages. It is designed for use in connection with the power take off on a tractor, jeep or other powered device which has means for transmitting power to auxiliary equipment.

The low cost of this device will make it more readily available to more users who would otherwise have to take their welding work in to some central place which specializes in such work, entailing considerable delay and expense.

My invention should have considerable merit for military use where it can be taken into combat areas where immediate welding repairs can be made without withdrawal of equipment to rear repair facilities.

Obviously, changes in form, proportion and details of construction may be resorted to without departing from the spirit of my invention and I reserve the right to such changes as come within the scope of these specifications and the claims to follow.

What I claim as new and desire to secure by Letters Patent is:

1. In a portable welding device of the class described, an upright frame comprising spaced members, wheels at the lower end of the frame, a drawbar extending forwardly from the frame and adapted for connection to a tractor or the like, an offset frame extension projecting rearwardly from the upper portion of the upright frame, a direct current generating unit mounted on the offset frame extension, a pair of speed step up drive members mounted between the spaced members of the upright frame, a shock absorbing coupling between the current generating unit and one of the drive members, a telescopic driving connection between the other drive member and the power take off on a tractor or the like, and a reactor coil connected to the generating unit and supported between the upright and offset frames.

2. The structure as specified in claim 1, including leads from the welding unit, and arms carried by the offset and upright frames for carrying the leads when they are not in use.

3. In a portable welding device of the class described, an upright transverse frame, a second frame extending rearwardly from one side of the transverse frame, a direct current generating unit mounted on the offset frame extension, a pulley journaled on the transverse frame in alignment with the generating unit, a shock absorbing coupling between the generating unit and the pulley, a second pulley journaled on the opposite side of the tranverse frame from the first mentioned pulley and in alignment therewith, a belt drive between the pulleys, a telescopic driving connection between the second mentioned pulley and the power take off on a tractor or the like, a reactor coil connected to the generating unit and carried by the transverse frame and the offset frame at the juncture thereof, and a drawbar extending forwardly from the frame and adapted for connection to a tractor or the like.

WESLEY HAGELGANTZ.

REFERENCES CITED

The following references are of record in the file of this patent:

UNITED STATES PATENTS

| Number | Name | Date |
|---|---|---|
| 1,834,100 | Knapp et al. | Dec. 1, 1931 |
| 1,871,306 | Davies | Aug. 9, 1932 |
| 1,896,901 | Knapp et al. | Feb. 7, 1933 |
| 1,985,888 | Day | Jan. 1, 1935 |
| 2,000,161 | Burgett | May 7, 1935 |
| 2,530,487 | Thorndyke | Nov. 21, 1950 |